(12) United States Patent
Lu et al.

(10) Patent No.: US 12,720,459 B2
(45) Date of Patent: Aug. 25, 2026

(54) CONFIGURATION OF A CELLULAR NETWORK MOBILE STATION FOR ROAMING OPERATION

(71) Applicant: Vodafone Group Services Limited, Newbury (GB)

(72) Inventors: Yang Lu, London (GB); Christopher Pudney, London (GB); Peter Dawes, London (GB)

(73) Assignee: Vodafone Group Services Limited, Newbury (GB)

( * ) Notice: Subject to any disclaimer, the term of this patent is extended or adjusted under 35 U.S.C. 154(b) by 497 days.

(21) Appl. No.: 18/166,418

(22) Filed: Feb. 8, 2023

(65) Prior Publication Data

US 2023/0254803 A1 Aug. 10, 2023

(30) Foreign Application Priority Data

Feb. 10, 2022 (GB) ..................................... 2201719

(51) Int. Cl.
*H04W 60/04* (2009.01)
*H04W 48/16* (2009.01)
*H04W 84/04* (2009.01)

(52) U.S. Cl.
CPC ........... *H04W 60/04* (2013.01); *H04W 48/16* (2013.01); *H04W 84/042* (2013.01)

(58) Field of Classification Search
CPC .... H04W 60/04; H04W 48/16; H04W 84/042
(Continued)

(56) References Cited

U.S. PATENT DOCUMENTS

2018/0242229 A1 8/2018 Ahluwalia
2019/0289537 A1 9/2019 Ahluwalia
(Continued)

FOREIGN PATENT DOCUMENTS

EP 3 402 254 A1 * 11/2018 ............ H04W 48/18
WO 2008/087251 7/2008
(Continued)

OTHER PUBLICATIONS

3GPP TR 2.821 V1.2.0—Jun. 2021 (Year: 2021).*
(Continued)

*Primary Examiner* — Rafael Pérez-Gutiérrez
*Assistant Examiner* — Aaron C. Deditch
(74) *Attorney, Agent, or Firm* — Workman Nydegger

(57) ABSTRACT

A cellular network mobile station (MS) is configured for roaming operation. A prioritization of one or more Public Land Mobile Network (PLMN) configurations is stored at the MS. When the MS is attached or registered for access to a PLMN that is not a Home PLMN or PLMN configuration that is not a highest priority PLMN configuration, it performs an idle mode search for a higher priority PLMN configuration at intervals of time. A duration of the intervals is determined according to a primary search period parameter stored at the MS. The MS is configured with a secondary search period parameter, which indicates one or more factors to be applied to the primary search period parameter when determining the duration of the intervals, such that each of the factors is applied according to a respective associated condition indicative of a number of PLMN configurations available for the MS to access.

10 Claims, 2 Drawing Sheets

(58) Field of Classification Search
USPC ........................................................ 455/435.1
See application file for complete search history.

(56) References Cited

U.S. PATENT DOCUMENTS

| | | | | |
|---|---|---|---|---|
| 2021/0282080 | A1 | 9/2021 | Yang | |
| 2021/0410025 | A1 | 12/2021 | Dharmadhikari | |
| 2022/0232464 | A1* | 7/2022 | Matolia .............. | H04B 7/18554 |
| 2023/0247639 | A1* | 8/2023 | Yan ....................... | H04L 1/1896 370/329 |

FOREIGN PATENT DOCUMENTS

| | | |
|---|---|---|
| WO | 2015/118331 | 8/2015 |
| WO | 2015/154789 | 10/2015 |
| WO | 2022016551 A1 | 1/2022 |

OTHER PUBLICATIONS

2015—00—LTE eRAN8.1 Idle Mode Issue 1.01 (Year: 2015).*
3GPP TS 31.102 V16.9.0—Dec. 2021 (Year: 2021).*
3GPP TS 23.502 V17.3.0 (Dec. 2021) (pp. 1 and 45) (Year: 2021).*
3GPP TR 24.821 V1.2.0—Jun. 2021 (Year: 2021).*
GB2201719.8 Search and Examination Report dated Jul. 20, 2022 (4 pages).
EP Search Report for application No. 23153870.3 dated Jun. 1, 2023.
Office Action received for European Application No. 23153870.3, mailed on Mar. 27, 2026, 6 pages.

* cited by examiner

CONFIGURATION OF A CELLULAR NETWORK MOBILE STATION FOR ROAMING OPERATION

This application claims priority from GB Patent Application No: 2201719.8, filed Feb. 10, 2022, which is expressly incorporated by reference herein in its entirety.

TECHNICAL FIELD OF THE DISCLOSURE

The disclosure concerns configuration of a cellular network mobile station (MS) for roaming operation and a computer program, a device for a mobile station and/or a network entity arranged to operate accordingly.

BACKGROUND TO THE DISCLOSURE

Cellular networks are configured for each mobile station (sometimes termed "MS" or "User Equipment" or "UE" in standard specifications from the Third Generation Partnership Project, 3GPP) to receive service by accessing a Public Land Mobile Network (PLMN). A PLMN normally has a geographically limited service coverage. An MS is associated with a cellular network subscriber, for example by means of a Subscriber Identity or Identification module (SIM) or Universal SIM (USIM). Where the term MS is used herein, this may encompass a User Equipment (UE), which according to existing 3GPP standards is subdivided into a UICC (containing USIM) domain and a Mobile Equipment (ME) domain. Each subscriber has an associated Home PLMN (HPLMN) and the MS may receive service through the HPLMN. When the MS is outside the service coverage of the HPLMN or for other service reasons, it may also access a different PLMN (termed a Visited PLMN or VPLMN). This is termed roaming operation.

When roaming, it may be desirable for the MS to access a specific PLMN. For example, the specific PLMN may be associated or have some agreement with the HPLMN of the MS. In some cases, a roaming MS may detect more than one PLMN. In that case, the MS has a prioritization of PLMNs stored (generally in the (U)SIM). The MS can then try to access the PLMN available for access with the highest prioritization. The prioritization may be Radio Access Technology (RAT) specific. In other words, the prioritization may comprise a prioritized list of PLMN and RAT combinations.

A MS registered for access with a VPLMN (for example, in a country outside the country of the HPLMN) and operating in idle mode will conduct a search (or scan) for the HPLMN, an equivalent to the HPLMN or a higher priority VPLMN at regular intervals. This is discussed in 3GPP Technical Specification (TS) 23.122 (section 4.4.3.3). The duration of the intervals between the searches is configured in the (U)SIM as discussed in 3GPP TS 31.102, section 4.2.6):

"4.2.6 $EF_{HPPLMN}$ (Higher Priority PLMN search period)

This EF contains the interval of time between searches for a higher priority PLMN (see 3GPP TS 23.122 [31]).

| Identifier: '6F31' | Structure: transparent | Mandatory |
|---|---|---|
| SFI: '12' | | |
| File size: 1 byte | Update activity: low | |
| | Access Conditions: | |
| READ | PIN | |
| UPDATE | ADM | |
| DEACTIVATE | ADM | |
| ACTIVATE | ADM | |

-continued

| Bytes | Description | M/O | Length |
|---|---|---|---|
| 1 | Time interval | M | 1 byte |

Time interval.

Contents:

the time interval between two searches.

Coding:

For UEs not using any of the following at the time of starting the timer: NB-IoT, GERAN EC-GSM-IoT and Category M1 of E-UTRAN enhanced-MTC as specified in 3GPP TS 36.306 [85], the time interval is coded in integer multiples of n minutes. The range is from n minutes to a maximum value. The encoding is:

'00': No higher priority PLMN search attempts;

'01': n minutes;

'02': 2n minutes;

: :

'YZ': (16Y+Z)n minutes (maximum value).

For UEs using any of the following at the time of starting the timer: NB-IoT, GERAN EC-GSM-IoT and Category M1 of E-UTRAN enhanced-MTC as specified in 3GPP TS 36.306 [85], the time interval is coded as follows. The range is from n hours to a maximum value. The encoding is:

'00': No higher priority PLMN search attempts;

'01': n hours (2 hours);

'02' to '28': 2n hours (i.e. range from 4 hours to 80 hours with step of 2 hours);

'29' to '50': 4n-80 hours (i.e. range from 84 hours to 240 hours with step of 4 hours).

All other values shall be interpreted by the ME as a default period.

For specification of the integer timer interval n, the maximum value and the default period refer to 3GPP TS 23.122 [31].

NOTE: Care should be taken in the configuration of this EF, as the value stored can be interpreted in different ways depending on the type of device used."

The value of "n" may be set by a Minimum Periodic Search Timer and for an MS not using any of the categories listed in the standard (as above), this may be 6 minutes. For instance, if the configured value for $EF_{HPPLMN}$ is 0x02, the interval of time may then be 12 minutes. This means that the MS searches through all the frequency bands every 12 minutes to find a higher priority PLMN available (in that country). According to the existing 3GPP standards, a single value for this search is configured in the USIM and this value is used by the MS in all roaming situations.

In December 2021, 3GPP revised 3GPP TS 22.011, section 3.2.2.5 (Periodic network selection attempts) as follows (CR0326): " . . . a UE in Automatic Mode shall make periodic attempts to look for a higher priority PLMN including associated Access Technology of the same country as the currently received PLMN including associated Access Technology or for a higher priority PLMN including associated Access Technology that uses a Shared MCC (e.g. MCC=901). If the currently received PLMN including associated Access Technology uses a Shared MCC, also a higher priority PLMN including associated Access Technology using any non-shared MCC shall be considered." It can be seen that, before this new service requirement was specified, searches for a higher priority PLMN while roaming were limited to PLMNs using a non-shared Mobile Country Code (MCC). Now, these searches will include a PLMN using a shared MCC, such as a PLMN using a satellite RAT, for instance a satellite NG-RAN (Next Generation—Radio Access Network) access technology with a shared MCC. It is noted that 3GPP TR 21.905 V17.1.0 defines a PLMN as a "telecommunications network providing mobile cellular services", thus including networks with non-terrestrial RAN. In view of this change, it is desirable for the higher priority PLMN searches to be more efficient and effective.

SUMMARY OF THE DISCLOSURE

Against this background, the present disclosure provides a method for configuring a cellular network mobile station (MS) for roaming operation according to claim 1 and a mobile station in accordance with claim 9. Other preferred features are disclosed with reference to the claims and in the description below.

In addition to a primary search period parameter stored at the MS or (U)SIM (for example, the Higher Priority PLMN search period discussed above), a further, "secondary" search period parameter is stored. This defines a factor (or multiple factors) to be applied to the primary search period parameter in certain scenarios. Such scenarios may each be defined by a respective condition that indicates a number of PLMNs (or combinations of PLMN and access technology) available for the MS to access, for instance that the number is smaller than a threshold or an expected situation. This allows the MS to reduce the frequency (increase the period) of idle mode PLMN searches in scenarios where the normal frequency defined by the primary search period parameter would be undesirable or detrimental. The secondary search period parameter is beneficially stored at the MS (in the (U)SIM).

Advantageously, each factor indicates a multiplier to be applied to the primary search period parameter if the respective condition is met. The factor or factors may be coded as integers, in particular having a value of at least two. The maximum value may be determined by the coding, for example by a two digit hexadecimal integer (corresponding with 255 in decimal).

The conditions may include one or more of: whether the MS is attached or registered for access to a non-terrestrial (for instance, satellite) PLMN using a shared Mobile Country Code, MCC; if a disaster condition applies; and if a location of the MS is inside or outside one or more defined geographical areas. The defined geographical areas may be those without terrestrial PLMN coverage (for example, open sea areas, mountain areas, desert areas or similar).

The network (particularly the Home PLMN) may configure the MS (specifically the (U)SIM) with the secondary search period parameter initially or the secondary search period parameter may be communicated from a network entity of the cellular network to the MS; and The MS ((U)SIM) typically also stores a prioritization of PLMNs (for example, a Higher Priority PLMN list). The prioritization of the PLMNs may be specific to each radio access technology used. Thus, the prioritization may be of PLMN and radio access technology combinations. The idle mode search may also be for such PLMN and radio access technology combinations.

The MS applies the secondary search period parameter by identifying if one of the conditions is met and then applying the factor (multiplier) associated with that condition accordingly. The period for idle mode search operation is then adjusted accordingly.

The approach according to the disclosure may be implemented as any one of more of a method, a computer program, a controller, a (U)SIM, a MS (or a part of a MS) or a network node or entity.

BRIEF DESCRIPTION OF THE DRAWINGS

The approach of the disclosure may be put into practice in various ways, one of which will now be described by way of example only and with reference to the accompanying drawings in which.

Where a drawing indicates a feature also shown in another drawing, identical reference numerals have been used.

DETAILED DESCRIPTION OF PREFERRED EMBODIMENTS

Figure 1:
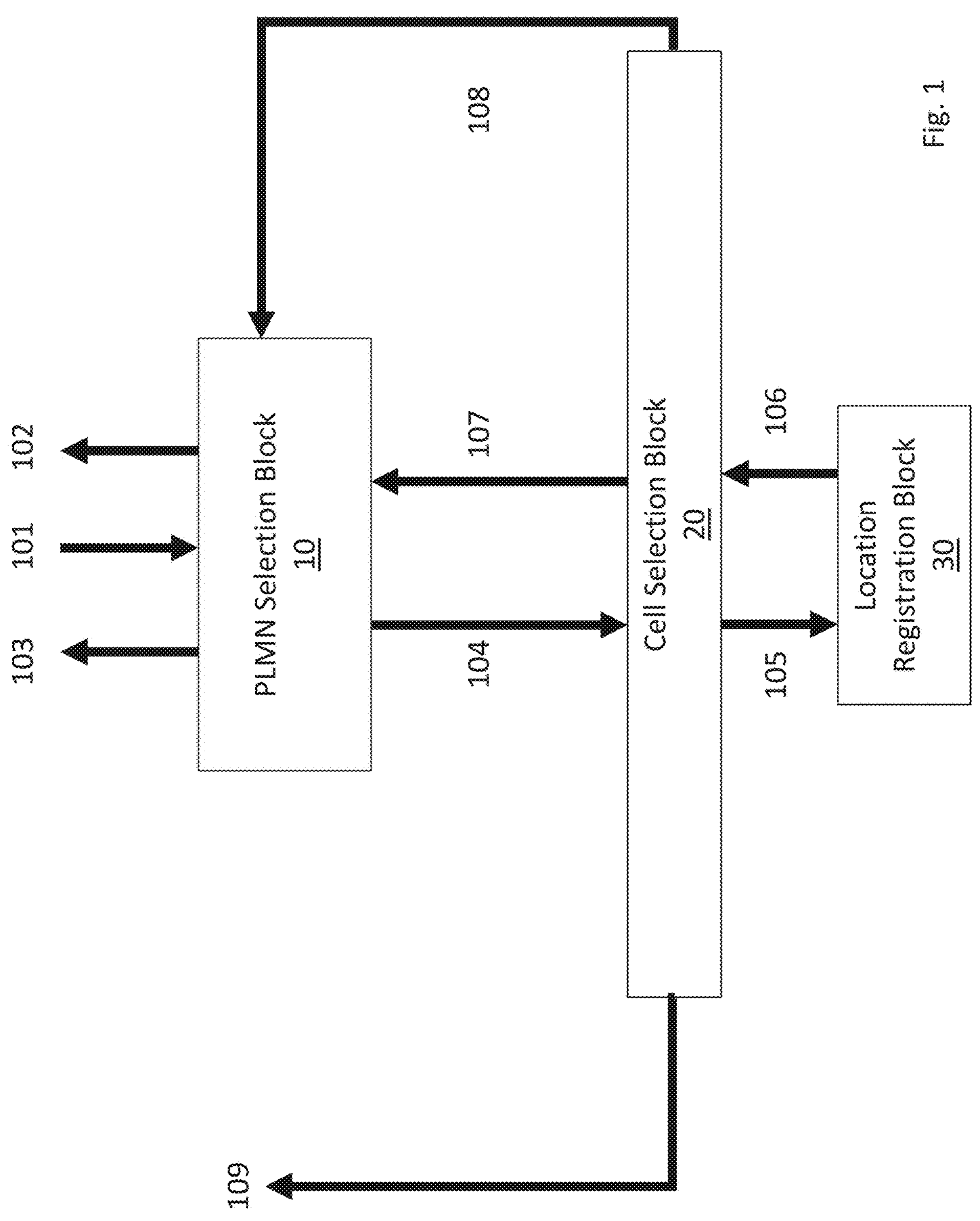
FIG. 1 illustrates a flow chart of an existing idle mode process followed by a MS.

Referring to FIG. 1, there is illustrated a flow chart of an existing idle mode process followed by a MS according to a simplified version of FIG. 1 of 3GPP TS 23.122 V17.5.0. This comprises: a PLMN selection block 10; a cell selection block 20; and a location registration block 30.

In step 101, a PLMN selection mode is set (for example, by a user via a user interface or by AT command). In step 102, which only applies in a manual mode, a list of available PLMNs is presented to the user and in step 103, the user selects from the available PLMNs.

After selection of a PLMN, in step 104, the MS performs selection of a cell belonging to this PLMN. After selection of a new cell and a change in the registration area, step 105 is taken and the MS enters the location registration process 30. If the location registration is unsuccessful and if the cause received from the network does not exclude the Registered PLMN (RPLMN), in step 106, the MS performs another cell selection within the RPLMN. In this case, in step 107, the information on available PLMNs, as detected by the cell selection process from detectable broadcast information, is made available to the PLMN selection process.

If the location registration is not successful, and if the cause received from the network excludes the RPLMN, in step 108, the MS performs PLMN selection again. If location registration is successful, step 109 is taken and location registration is indicated to the user.

If the MS is registered with a cell of a VPLMN, but remains in idle mode, it will periodically search for a higher priority VPLMN (or the HPLMN). As discussed above, the period interval for this search is defined by $EF_{HPPLMN}$, which is stored in the USIM of the MS. This parameter is applied independently of where the MS is currently located and what Radio Access Technology is currently being used by the MS.

A number of scenarios have been identified where a fixed period for the idle mode PLMN search would be detrimental. For example, it is foreseen that satellite NG-RAN access for a PLMN with a shared MCC will be deployed over both continental and open sea geographical areas. In the mountain area and the open sea area deployment scenarios, it will therefore become common for a MS to receive access via a satellite NG-RAN access technology from a PLMN with a shared MCC. This MS is unlikely to be able to find a higher priority PLMN via a non-satellite (that is, terrestrial) RAN. The fixed time period for an idle mode PLMN search (for instance, 12 minutes as discussed above) may thus be inappropriate for this scenario. Moreover, use of such a short time period may cause unnecessary power consumption, which in scenarios where the MS is remote from external facilities (mountain, open sea, desert or the like), minimizing power consumption can be highly desirable for maintained service. Another scenario where frequent idle mode PLMN searches may be problematic is in a disaster situation. Indeed, it is already possible for a PLMN to indicate that a disaster condition is in effect. Further scenarios may be contemplated in which the MS has a limited choice of PLMNs available for access, such that the likelihood of a higher priority PLMN is reduced and frequent idle mode PLMN searches are less desirable or detrimental.

To address this issue, it is proposed to use a further parameter to set the period interval, together with the Higher Priority PLMN search period ($EF_{HPPLMN}$). Specifically, this is preferably a multiplier that is applied to the Higher Priority PLMN search period. In particular, this further parameter is only applied if certain scenarios apply. The scenarios include those discussed above, where the conditions in which the MS is operating mean that the likelihood of a higher priority PLMN is low or reduced (compared to operation in a normal coverage area with no connectivity problems). The multiplier in this case is preferably greater than one and more preferably an integer (for ease of coding) and typically therefore, has a value of at least two.

It is noted that US-2021/410025 discusses a situation in which the MS conducts a periodic measurement report and from that, identifies a higher priority network. Based on that identification, it then performs a "handover search" using a dynamically-triggered search timer value. The handover search proposed in this document is not an idle mode PLMN search, as it is triggered by identification of a specific PLMN, rather than being conducted at regular intervals. Thus, the suggestions of this document are quite different from this disclosure.

In general terms, there may thus be considered a method for configuring a cellular network mobile station (MS) for roaming operation. The MS (in particular, a (U)SIM of the MS) stores a prioritization of one or more PLMN configurations (for example, as a higher priority PLMN list). Moreover, the MS is configured, when attached or registered for access to (or camped on) a PLMN that is not a Home PLMN or a PLMN or PLMN configuration that is not a highest priority PLMN or PLMN configuration, to perform an idle mode search for a higher priority PLMN (or PLMN configuration) at intervals of time. A duration of the intervals is determined according to a primary search period parameter stored at the MS (for example, a Higher Priority PLMN search period or $EF_{HPPLMN}$). The method comprises configuring the MS with a secondary search period parameter (that is, a further search period parameter in addition to the primary search period parameter). The secondary search period parameter indicates one or more factors to be applied to the primary search period parameter when determining the duration of the intervals, such that each of the one or more factors is applied according to a respective associated condition that is indicative of a number of PLMNs or PLMN configurations available for the MS to access.

For example, each of the one or more factors may indicate a multiplier to be applied to the primary search period parameter if the respective condition is met, which is preferably an integer and more preferably at least two. One or more (and typically all) of the: the prioritization; the primary search period parameter; and the secondary search period parameter are configured in a Subscriber Identity (or Identification) Module ((U)SIM) associated with the MS.

This method may be implemented at a MS, in a SIM or USIM (or equivalent), at a network entity or node of the cellular network, in a computer program or any combination of these. Thus, the disclosure also provides any of these devices or products configured to operate in accordance with process disclosed herein.

In this way, the period duration between idle mode PLMN searches can be increased in specific scenarios. This may be beneficial for power consumption without reducing the effectiveness of the MS in operating on the optimal PLMN at the current time. More specific details of the proposal are now presented, but further reference to the general terms of the disclosure will then be made below.

It is proposed that a mobile network operator can additionally configure one or more Multipliers (M) in a new file in the USIM by specifying for instance the following in 3GPP TS 31.102.

"4.2.x $EF_{MHPPLMN}$ (Multiplier for Higher Priority PLMN Search Period)

This EF contains a multiplier M which is used together with timer interval configured in $EF_{HPPLMN}$ to calculate the interval of time between searches for a higher priority PLMN (see 3GPP TS 23.122 [31]).

| Identifier: 'tbd' | | Structure: transparent | Mandatory |
|---|---|---|---|
| SFI: 'tbd' | | | |
| File size: 1 byte | | Update activity: low | |
| Access Conditions: | | | |
| READ PIN | | | |
| UPDATE | | ADM | |
| DEACTIVATE | | ADM | |
| ACTIVATE | | ADM | |

| Bytes | Description | M/O | Length |
|---|---|---|---|
| 1 | Multiplier M (scenario 1) | M | 1 byte |
| | . . . | | |
| 1 | Multiplier M (scenario x) | O | 1 byte |

Multiplier.

Contents:

the Multiplier M

NOTE: Multiplier M is used to together with timer interval configured in $EF_{HPPLMN}$ to calculate the time interval between two searches for a higher priority PLMN (see 3GPP TS 23.122 [31]).

Coding:

For all UEs supporting satellite NG-RAN access with a shared MCC as specified in 3GPP TS 23.122 [31], Multiplier M is coded in integer. The range is from two to a maximum value. The encoding is:

'00': 0.5;

'01': 1;

'02': 2;

: :

'YZ': (16Y+Z) (maximum value)."

With this new file, the home network operator can configure a value of M in their USIMs. A static configuration may be performed initially by the network, for example when the USIM cards are ordered. Additionally, the home network operator can also adapt its value depending on the current MS location. This can be done at any time when the MS is communicating with the HPLMN, for example, at the time when the MS is registering via the satellite NG-RAN access with a shared MCC with the HPLMN. In this way, the HPLMN can provide a new value of M to be used in the locations until the next registration and the MS then can calculate the interval of time between searches of a higher priority PLMN by multiplying integer M with the currently stored time value in USIM ($EF_{HPPLMN}$), as defined in TS 31.102 clause 4.2.6 (reproduced above).

Figure 2:
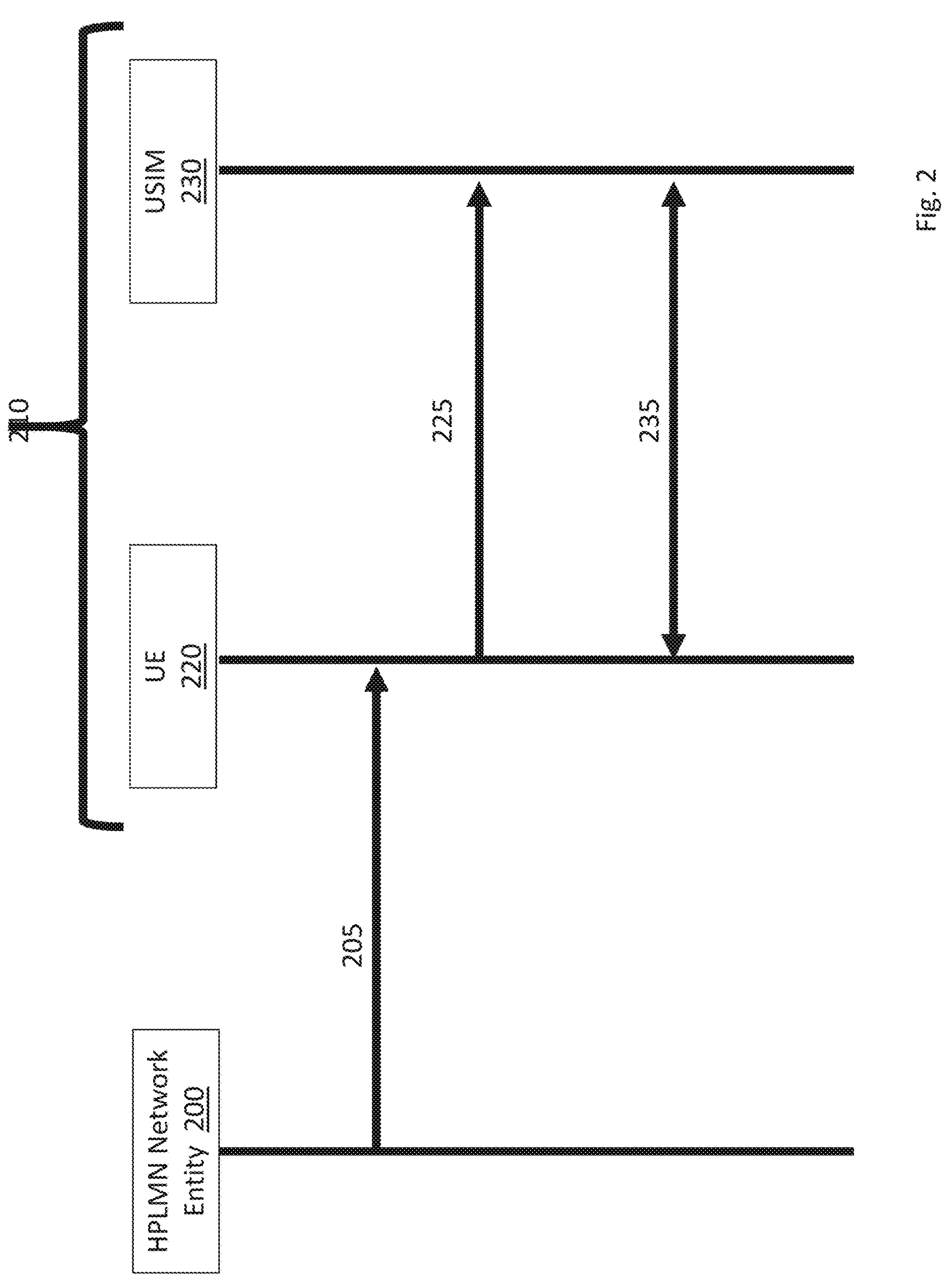
FIG. 2 depicts a schematic message flow of a process in accordance with the disclosure.

Referring now to FIG. 2, there is depicted a flow chart of a process for operation in accordance with the above. There is shown: a HPLMN network entity 200; and a MS 210 (comprising a UE 220 and a USIM 230). The HPLMN network entity (or node) 200 may comprise or be a Home Subscriber Server (HSS) or the equivalent entity in 5G, a Unified data management (UDM). The HPLMN network entity sends an instruction 205 to update the Multiplier for Higher Priority PLMN search period parameter. This instruction 205 is received at the UE 220. The UE 220 then communicates 225 this instruction to the USIM 230. This may be termed dynamic (over the air) configuration Subsequently, the UE 220 interrogates 235 the USIM 230 to identify the parameter for use in determining a period for idle mode PLMN searches. 3GPP TS 27.007 (in section 1) details controlling Mobile Termination (MT) functions and network services from a Terminal Equipment (TE) through Terminal Adaptor (TA) (see FIG. 1 of this document). The Mobile Equipment (ME) part of the UE provides the MT and TE functions.

The stored parameter and/or the standard specifying the parameter specify the scenarios for which each of the defined multipliers M apply. These scenarios may each define a respective condition. There are a number of possibilities for such conditions. One possibility is whether the MS is accessing a non-terrestrial (satellite or high altitude platform) radio access network, especially with a PLMN using a shared MCC. It is anticipated that 3GPP will define a shared MCC as follows: "MCC assigned by ITU-T as shared MCC according to ITU-T E.212, except within this specification for PLMN selection purposes the MCC of value 999 is not considered a shared MCC." It will therefore be immediately clear to a MS whether this condition applies, as the MS can readily identify the MCC of the PLMN it is accessing and the MS knows whether the radio access network is non-terrestrial. Another possibility is if the MS detects that one or more PLMNs have a disaster condition applied. Since this condition is typically enforced on networks by authorities in an emergency, it would be expected for multiple PLMNs (and often all PLMNs) in a geographical part of a country, a whole country or an international region to have this condition applied. A further possibility is for the MS to identify that its location means that the likelihood of a higher priority PLMN is reduced or low. The MS may establish its location by Global Navigation Satellite System (GNSS), for example Global Positioning System (GPS). A database of specific regions (for instance, open sea, mountains, desert or similar) may be stored in the MS, for which a corresponding scenario of reduced idle mode search frequency may apply. A condition based on a combination of these possibilities is also conceivable (for instance, location together with access via a non-terrestrial network). Other possibilities may be considered.

In view of the above, it will be appreciated that multiple scenarios may be specified, each scenario defined by a corresponding condition. A different multiplier M may be defined for each scenario.

If any of the scenarios identified are determined by the MS to apply, the MS uses the multiplier associated with that scenario when determining a period for idle mode PLMN searches. Specifically, the MS applies the multiplier to the stored Higher Priority PLMN search period parameter, to result in a time period that is longer. Typically, the scenarios will be mutually exclusive, so only one will apply. However, if multiple scenarios are found to apply, logic in the MS (UE and/or USIM) may establish whether more than one multiplier should be applied or just one multiplier. For example, the lowest multiplier of those with associated scenarios applying may be used first. If the idle mode PLMN search does not identify any other PLMNs, the second lowest multiplier may then be used and so on. Alternatively, the highest multiplier of those with associated scenarios applying might be used.

Returning to the general sense of the disclosure discussed above, a number of optional and/or advantageous features may also be considered in respect of any aspect described herein.

For example, each of the one or more factors may be coded in the secondary search period parameter as an integer (for instance, in hexadecimal format, preferably a two digit hexadecimal integer).

In embodiments, at least one of the conditions that is indicative of a number of PLMNs or PLMN configurations available for the MS to access may be based on one or more of: whether the MS is attached or registered for access to a non-terrestrial PLMN, preferably using a shared Mobile Country Code, MCC; whether the MS identifies that a disaster condition applies to at least one PLMN (or multiple PLMNs or all PLMNs in an area, country or region); and a determined location for the MS (for instance, obtained by GNSS), which may include whether the determined location is inside or outside one or more predetermined regions. For instance, the at least one of the conditions that is indicative of a number of PLMNs or PLMN configurations available for the MS to access may be based on whether the determined location for the MS has no terrestrial PLMN coverage, for example open sea areas, mountain areas, desert areas or similar.

The step of configuring may encompass a number of options. One option may be communicating (transmitting and/or receiving) the secondary search period parameter or an adjustment to the secondary search period parameter from a network entity or node of the cellular network to the MS. Another option may be storing the secondary search period parameter at the MS. These may be combined.

Although the one or more PLMN configurations may each define (only) a PLMN, more typically each of the one or more PLMN configurations comprises or defines a respective PLMN and associated single radio access technology. Thus, the prioritization of one or more PLMNs advantageously comprises a prioritization of each PLMN and a respective, single radio access technology. Thus, the MS may search for a higher priority PLMN using the same or different radio access technology from that being currently used. In particular, a PLMN using more than one radio access technology may have different priorities for the different radio access technologies.

Beneficially, if a condition associated with a factor of the one or more factors is established to be met, the factor may be applied in determining the duration of the intervals according to the primary search period parameter. Then, the search for a higher priority PLMN during idle mode operation may be performed in accordance with the determined duration of the intervals.

Any of the methods described herein may be implemented as a computer program. The computer program may be configured to control a MS, UE and/or a network node or entity to perform any method according to the disclosure. A network node of a cellular network may also be provided, configured to operate in accordance with certain methods disclosed herein. For example, the network node may include a processor and at least one communication interface, particularly comprising one or both of a transmitter and receiver. A UE may also be provided, configured to operate in accordance with certain methods disclosed herein. The UE may likewise include a processor and at least one communication interface, particularly comprising one or both of a transmitter and receiver.

Although specific embodiments have now been described, the skilled person will understand that various modifications and variations are possible. For example, whilst the disclosure is described in relation to existing network architecture, it will be understood that changes to the architecture (and/or nomenclature) are possible, but the present disclosure may still be applicable in this case. Whilst multipliers are identified as a particularly advantageous factor to be applied, the skilled person could conceive other factors, for instance, a mathematical power (such as squaring or cubing the time period) or some other mathematical operation, preferably to increase the time period in some way. Also, combinations of any specific features shown with reference to one embodiment or with reference to multiple embodiments are also provided, even if that combination has not been explicitly detailed herein.

The invention claimed is:

1. A method for configuring a cellular network mobile station (MS) for roaming operation, said method comprising:

storing a prioritization of one or more Public Land Mobile Network (PLMN) configurations at the MS, wherein:

when the MS is attached or registered for access to a PLMN that is not a Home PLMN or when the MS has a PLMN configuration that is not a highest priority PLMN configuration, the MS is configured to perform an idle mode search for a higher priority PLMN configuration at a search period, a duration of the search period is determined according to a primary search period parameter stored at the MS, and the primary search period parameter is defined by an EF (elementary file) HPPLMN (higher priority public land mobile network), which is a first file stored in a USIM (universal subscriber identity module) of the MS; and configuring the MS with a secondary search period parameter, wherein:

the secondary search period parameter is defined by a different EF, which is a second file stored in the USIM, the second file being different than the first file, the secondary search period parameter includes a plurality of integer multipliers that each have a value greater than 1, one or more of the integer multipliers are selectable for application against the search period, resulting in an extension to the search period and further resulting in multiple different search periods being available for use by the MS, and selection of the one or more integer multipliers is based on a determined operational scenario in which the MS is operating, wherein the second file in the USIM stores multipliers for respective scenarios, including a first scenario and a second scenario.

2. The method of claim 1, wherein a first integer multiplier is applied to the search period in response to detection of a first operational scenario, and wherein the first operational scenario is a disaster scenario.

3. The method of claim 2, wherein a second integer multiplier is applied to the search period in response to detection of a second operational scenario, and wherein the second operational scenario is a scenario in which the MS is accessing a non-terrestrial radio access network.

4. The method of claim 3, wherein a third integer multiplier is applied to the search period in response to detection of a third operational scenario, and wherein the third operational scenario is a scenario where a review of global positioning system (GPS) data indicates that a likelihood of finding a higher priority PLMN is reduced.

5. The method of claim 4, wherein the MS determines that at least two of the first, second, or third operational scenarios apply, and wherein at least two of the first, second, or third integer multipliers are applied to the search period.

6. The method of claim 1, wherein configuring the MS comprises:

communicating the secondary search period parameter, or an adjustment to the secondary search period parameter, from a network entity of the cellular network to the MS; and storing the secondary search period parameter at the MS.

7. The method of claim 1, wherein the primary search period parameter and the secondary search period parameter are stored in a Subscriber Identity Module (SIM) or a Universal Subscriber Identity Module (USIM) of the MS.

8. The method of claim 1, wherein multiple integer multipliers are selected for application against the search period.

9. The method of claim 1, wherein determining the operational scenario comprises using a determined location of the MS and a database of specific regions stored in the MS to determine that the MS is located in at least one of the specific regions.

10. A mobile station (MS) comprising:

one or more processors; and one or more non-transitory hardware storage devices that store instructions that are executable by the one or more processors to cause the MS to:

determine that the MS has a Public Land Mobile Network (PLMN) configuration that is not a highest priority PLMN configuration;

initiate an idle mode search for a higher priority PLMN configuration, wherein the idle mode search is performed at a search period, wherein a duration of the search period is based on a primary search period parameter that is stored at the MS, and wherein the primary search period parameter is defined by an EF (elementary file) HPPLMN (higher priority public land mobile network), which is a first file stored in a USIM (universal subscriber identity module) of the MS;

in response to determining that the MS is operating in a recognized operational scenario, access a secondary search period parameter, wherein:

the secondary search period parameter is defined by a different EF, which is a second file stored in the USIM, the second file being different than the first file, the secondary search period parameter includes a plurality of integer multipliers that each have a value greater than 1, each integer multiplier is associated with a predetermined operational scenario of the MS, and one or more of the integer multipliers are selectable for application against the search period, resulting in an extension to the search period and further resulting in multiple different search periods being available for use by the MS;

select a particular integer multiplier based on the recognized operational scenario in which the MS is operating, wherein the second file in the USIM stores multipliers for respective scenarios, including a first scenario and a second scenario;

apply the particular integer multiplier to the search period, resulting in an extended search period; and perform the idle mode search using the extended search period.

* * * * *